(12) United States Patent
Addy

(10) Patent No.: US 6,578,454 B2
(45) Date of Patent: Jun. 17, 2003

(54) MACHINING PROCESS FOR HYDRODYNAMIC BEARING

(75) Inventor: Roger Allen Addy, Gilroy, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/782,388

(22) Filed: Feb. 12, 2001

(65) Prior Publication Data

US 2001/0023627 A1 Sep. 27, 2001

Related U.S. Application Data

(63) Continuation of application No. 09/101,177, filed on Dec. 22, 1999, now abandoned.

(51) Int. Cl.[7] .............................. B23B 1/00; B23B 3/00
(52) U.S. Cl. ............................................ 82/1.11; 82/47
(58) Field of Search .......................... 82/1.11, 47, 46, 82/53, 103, 104, 112, 120, 121

(56) References Cited

U.S. PATENT DOCUMENTS

| 5,577,842 | A | * | 11/1996 | Parsoneault et al. ........ 384/114 |
| 5,795,074 | A | | 8/1998 | Rahman et al. |
| 6,121,703 | A | * | 9/2000 | Kloeppel et al. ............. 310/90 |
| 6,196,722 | B1 | * | 3/2001 | Asada et al. ................ 384/107 |
| 6,250,807 | B1 | * | 6/2001 | Mori et al. .................. 384/100 |

* cited by examiner

Primary Examiner—Henry W. H. Tsai
(74) Attorney, Agent, or Firm—Moser, Patterson & Sheridan, LLP

(57) ABSTRACT

An improved hydrodynamic bearing design and method for fabricating a hydrodynamic bearing is disclosed, which incorporates a filling groove so that oil or other lubricating fluid can be efficiently inserted into the bearing gap without risking the loss of fluid during operation; the method provides for fabricating the hydrodynamic bearing and its oil filling groove so that the efficiency of the manufacturing process is not compromised. The same grooving tool which forms the hydrodynamic bearing is scraped across an abutment on the sleeve which supports the counterplate to form a shallow filling groove under the counterplate.

7 Claims, 5 Drawing Sheets

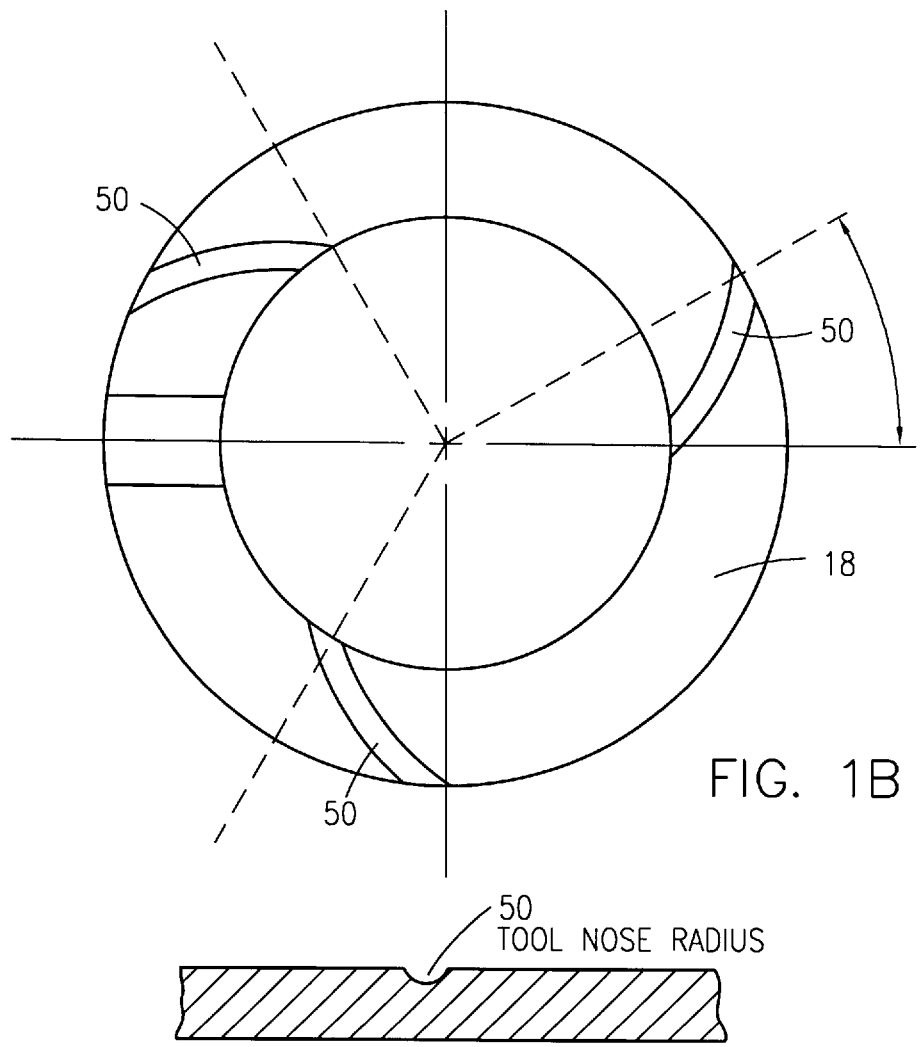
FIG. 1B
SIDE VIEW OF SCALLOP GROOVE
FIG. 1C
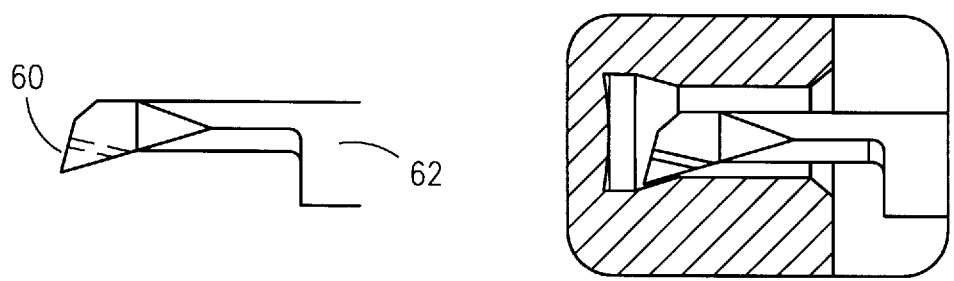
FIG. 2A  FIG. 2B

MACHINING PROCESS FOR HYDRODYNAMIC BEARING

This continuation application claims priority to pending U.S. application Ser. No. 09/101,177 filed Dec. 22, 1999 now abandoned.

FIELD OF THE INVENTION

The present invention relates to the field of hydrodynamic bearing assemblies, and more specifically to an improved method for machining the hub and sleeve of a hydrodynamic bearing element.

BACKGROUND OF THE INVENTION

Hydrodynamic bearings have been the subject of considerable research and development in the past few years. In these types of systems, a lubricating fluid-either gas or liquid-functions as the actual bearing surface between a stationary base or shaft and a rotating sleeve or hub of the motor, or between two such relatively rotating parts. Such bearings have a number of advantages over conventional ball bearings. Such ball bearings, especially when used in motors which are used in disc drives or the like have problems in a number of areas. Specifically, shocks to the disc drive may in turn create a force across the mechanical bearing system which can lead to deformation and damage to the raceway and balls of the ball bearing. Over time, this could result in a failure of the spindle motor to be able to run smoothly and without vibration. Since the spindle motor is directly coupled to the discs, the vibration could easily be directly transferred. A misalignment between the disc which the spindle supports and the transducer which is used to access the surface of the disc could also occur. In either case, the transducer which flies close to the disc surface is more likely to impact the disc.

However, the very fact that a fluid is being used as the bearing surface in a hydrodynamic bearing demands that the bearing must have very fine tolerances for the gap between the shaft and the sleeve, in turn, requiring highly accurate machining of all surfaces. Further, the surfaces must be cleaned of any imperfections which could result in scraping or other damage to the near by facing surface which forms the opposite side of the gap, or in turn the generation of particles. All these goals must be achieved with an economically efficient manufacturing process.

Finally, it is important that provision be made for filling the gap between the shaft and the sleeve. It is important that access be provided to the hydrodynamic bearing gap so that fluid or gas can be inserted into the gap; by the same token, it must be provided that this gap does not diminish the performance of the hydrodynamic bearing, or make it easy for the fluid to leak out of the bearing, or for air to enter the bearing which could diminish the performance of the bearing fluid.

SUMMARY OF THE INVENTION

It is therefore an object of the present invention to provide an improved hydrodynamic bearing design and an improved method for fabricating the hydrodynamic bearing.

It is a further objective of the invention to provide a hydrodynamic bearing design which incorporates a filling groove so that oil or other lubricating fluid can be efficiently inserted into the bearing gap without risking the loss of fluid during operation.

It is yet another objective of the invention to provide an improved method for fabricating the hydrodynamic bearing and its oil filling groove so that the efficiency of the manufacturing process is not compromised.

These and other objectives of the invention are achieved in a hydrodynamic bearing assembly including a shaft and surrounding sleeve which define the hydrodynamic bearing gap, the shaft and sleeve defining at the end of the sleeve a flat, radial surface. In forming the bore through the sleeve, which is the outer surface of the hydrodynamic bearing, a boring bar is used having a sharp nose which is used for cutting the interior surface of the bore. The same tool nose, when dragged across a portion of the radial surface at the end of the sleeve forms a groove across this radial surface of the sleeve. The operation may be repeated one or more times, depending on the speed at which the oil is being inserted into the hydrodynamic bearing gap during assembly.

By following this process, the entire boring process is simply achieved without changing the tools which are being used in the boring machine, resulting in an efficient, high speed boring process.

Other features and advantages of the invention may be apparent to a person of skill in the art who studies the following description of a preferred embodiments of the method and apparatus for the present invention given in conjunction with the accompanying drawings.

BRIEF DESCRIPTION OF THE DRAWINGS

FIGS. 1B and 1C are end and side views of a portion of the sleeve which is ground and bored in FIG. 2, showing the filling grooves of the invention;

FIGS. 2A and 2B are sectional illustration views of the grooving tool which is used in implementing the present invention;

DETAILED DESCRIPTION OF A PREFERRED EMBODIMENT

The following description of a preferred embodiment is showing in conjunction with a single type of hydrodynamic bearing incorporated in a specific spindle motor. However, the apparatus and method disclosed herein is equally useful in any hydrodynamic bearing, especially those which present the difficulty of adequately and rapidly filling the bearing.

Hydrodynamic bearings manufactured according to the method of this invention have many uses other than in hard disc drives, and the invention is not intended to be limited to use in bearings and or motors in such an environment. However, this invention is especially useful in this field because of the importance of reliable manufacturing and easy filling of the bearing, as well as the maintenance of close tolerances throughout the manufacturing and assembly.

Figure 1A:
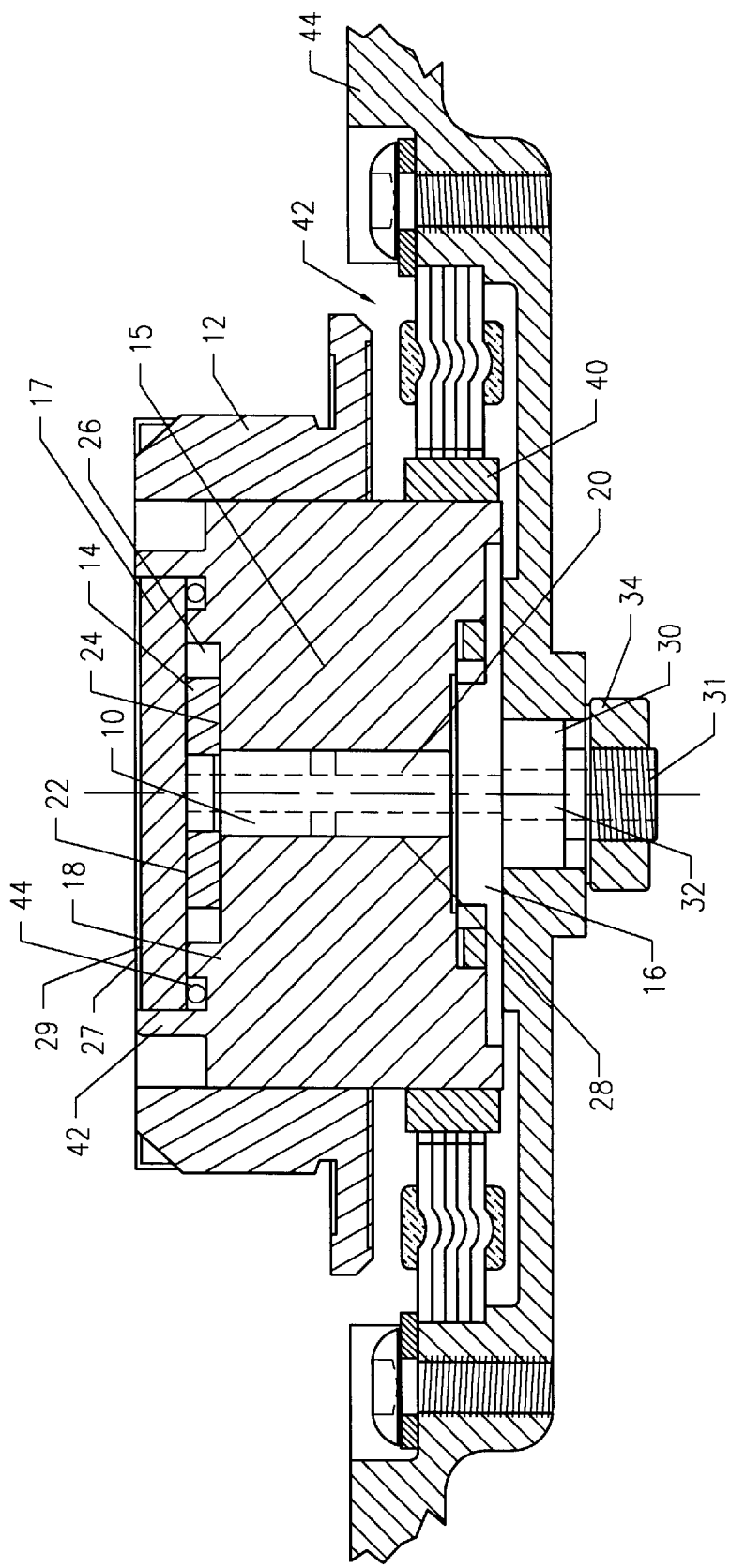
FIG. 1A illustrates a typical hydrodynamic bearing and motor with which the present invention is useful.

The basic structure of the motor with the hydrodynamic bearing, or at least as much as is relevant to this invention, as shown in FIG. 1A, includes a stationary shaft 10 and a hub 12 which rotates around the shaft. The shaft supports a thrust plate 14 at one end, and includes at or near the other end a shoulder 16. The shaft and shoulder incorporate a shaft extension 30 having a threaded region 31 which can be used to mount the stationary shaft into the base 44 of a housing for a disc drive or the like. The hub 12 which will support a disc or discs is mounted on a sleeve 15 and cooperates with the shaft 10 and counterplate 14 to define the gaps of the hydrodynamic bearing. The sleeve 15 also houses or supports a counterplate 17 which rests on a shoulder 18 of the sleeve and completes the definition of the hydrodynamic bearing gap. One of the two opposing surfaces of the shaft thrust plate assembly and the bushing/counterplate assembly typically carries on at least a portion of the surface cylindrical sections of spiral grooves to create fluid pressures within the gap which maintains the fluid bearing within the gap when rotation of the sleeve around the shaft is occurring.

It should be pointed out at this time that it is the relative rotation of the surfaces of the shaft and sleeve that is important to establishing and maintaining the bearing action. Therefore, the principles of boring and grooving the sleeve surfaces in carrying out this invention can be used as well in creating a bearing or motor where the shaft is rotating and the sleeve is stationary.

Special notice should be taken of two axial features on the sleeve 15. One of these is the shoulder 42 which extends axially above the radial plane of the thrust plate 14. The counterplate 17 is fitted inside this shoulder. Therefore, machining of this feature to accurate dimensions is important. Further, note should be taken of the upright 18 on which the counterplate rests. The upright defines a surface which accurately locates the axial position of the counterplate 17. Further, the opening 44 between the upright 18 and the shoulder 42 is filled with a O-ring or equivalent 44 which is pressed between the counterplate 17 and the sleeve 15 so that fluid cannot easily escape from the bearing groove.

A final feature appears in FIG. 1B, which is a top plan view of the upright 18. This plan view shows a plurality of slightly curved grooves 50 which extend entirely across the upright 18. Each of these grooves (which are shown in side view in FIG. 1C) is slightly curved, so that it may be formed by the radius of the nose of the tool which is also used to machine the other precisely located surfaces of the sleeve and hub as will be explained below. As will become apparent from looking at the tool which is used for the majority of the steps of the process, as well as the sequence of steps, the use of the tool nose to form this groove 50 clearly increases the speed of manufacture of the sleeve, and eliminates the need for changing tools, which is a time consuming process. Further, burring is minimized since there is no right angle with the surface on which the groove is being formed.

The tool itself appears in FIGS. 2A and 2B; its specific design is not a part of the invention, but is a known grooving tool made by P. H. Horn Corporation. FIG. 2A shows the nose of the tool 60 and the shank 62 by which it is grasped by the toolholder; the tool at work in a view taken from a brochure by the supplier of the tool is shown at FIG. 2B.

Figure 3A:
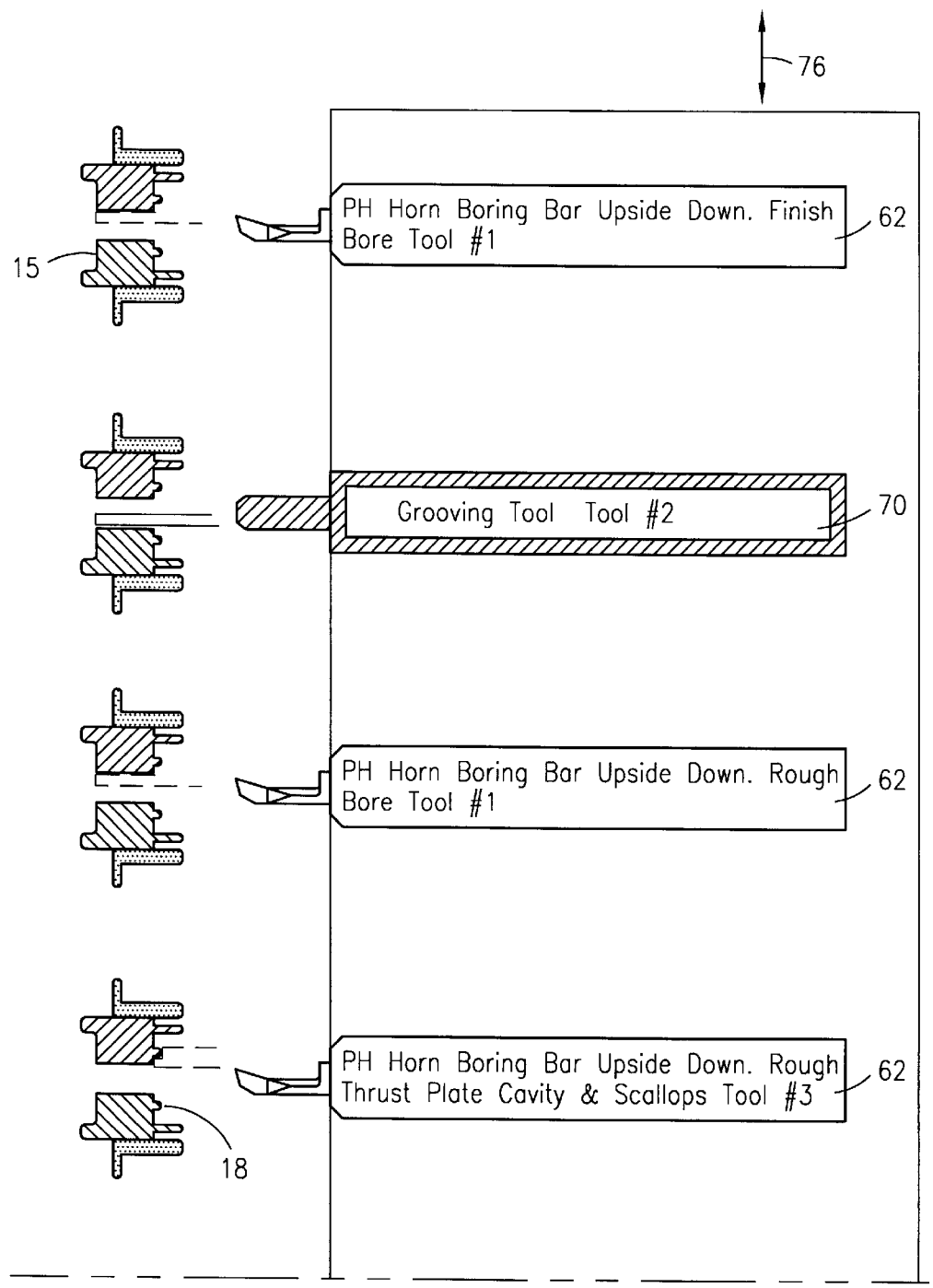
FIGS. 3A and 3B illustrates the step sequence for the method of boring the sleeve of the present invention.
Figure 3B:
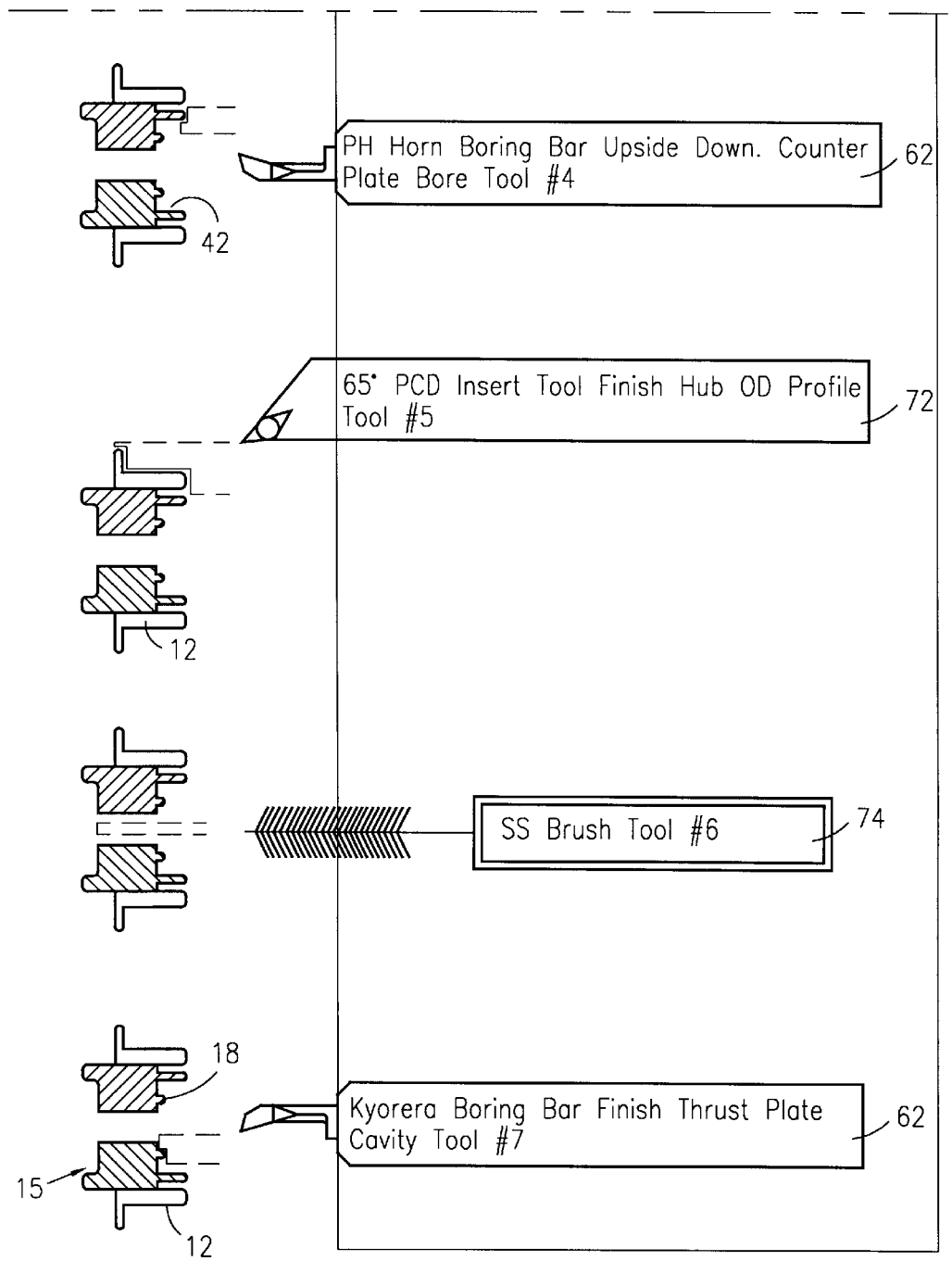

FIG. 3 shows on its left side in a schematic view the sleeve 15 and hub 12 which are formed by the sequence of steps to be discussed. The center of the figure shows the platform 70 on which the tools are to be mounted. Although the grooving tool of FIGS. 2A and 2B appear in a number of steps, obviously only one such tool needs to be provided on the platform which is why the boring bar 62 which is used in performing a number of different steps is indicated by the same reference number 62. The boring bar 62 is mounted on the same platform with a grooving tool 70, a tool 72 for finishing the exterior of the hub, and a brush tool 74 for cleaning the interior surface of the bore.

Figure 4:
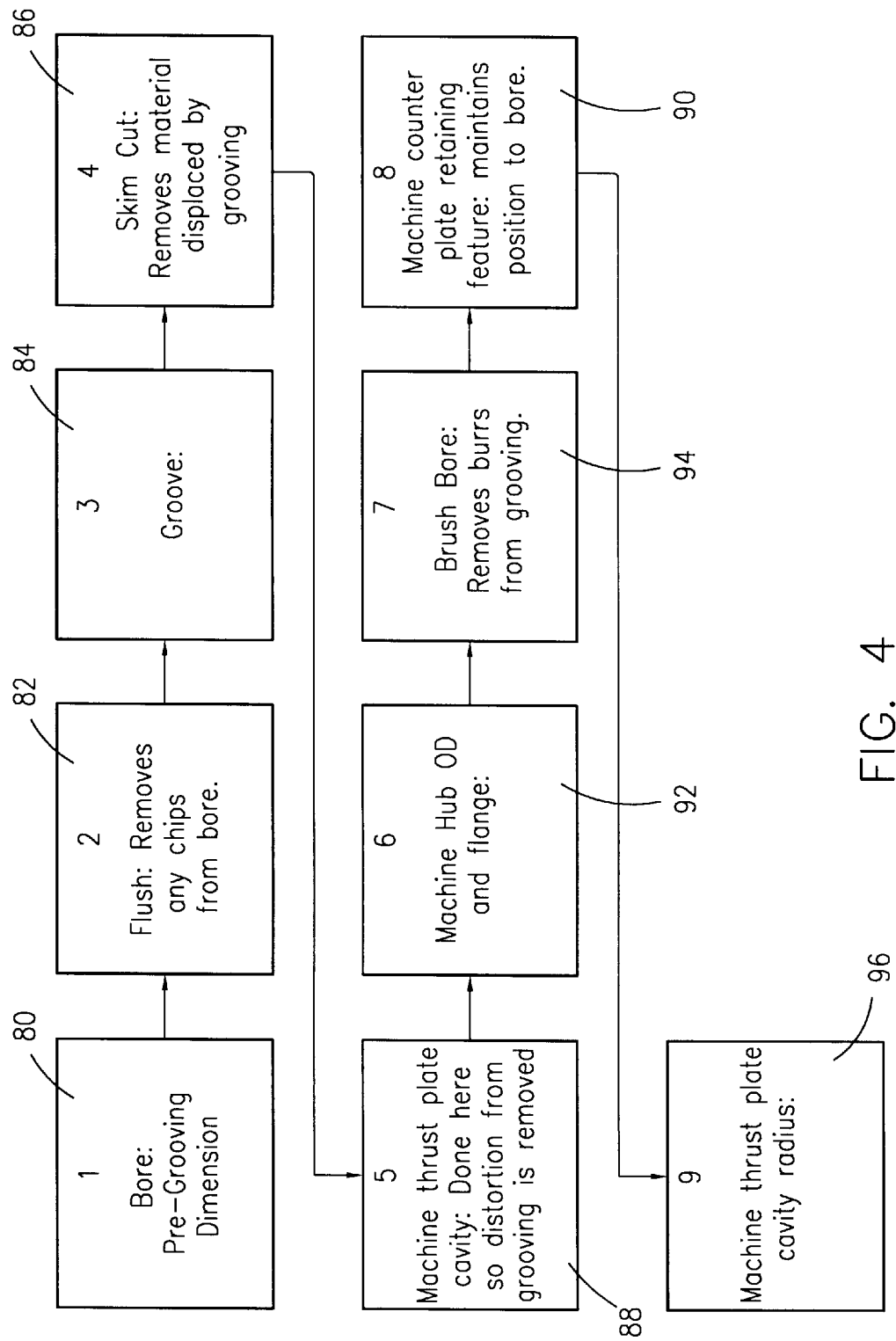
FIG. 4 is a flow chart of the sequence of FIG. 3.

Thus referring to the flow chart of FIG. 4 in conjunction with the platform supported tools of FIG. 3, the platform moves back and forth (i.e. radially relative to sleeve 15) in the direction indicated by the arrow 76 to bring the appropriate tool into alignment with the sleeve. The first step 80 is to bore the pregrooving dimension in the sleeve 15. The platform also moves axially to bring the selected tool into contact with the sleeve to carry out each step.

After pre-grooving 80, the platform is then stepped radially to align the grooving tool 70 with the bore of the sleeve. After a flushing step 82, the grooves for the hydrodynamic bearing discussed above are formed at step 84. The platform is then again stepped radially to realign the tool 62 with the bore and do a skim cut 86 which removes any material displaced by the grooving so that no excess material remains within the bore. This is an important step because of the close tolerances used for the hydrodynamic bearing. At the next step, 88, the cavity in the sleeve for the thrust plate which sits inside the abutment 18 is machined. This is done so that any distortion from the grooving is removed. At the completion of this step, the nose 60 of the tool 62 is scraped slowly across the top surface of this abutment 18 forming the grooves 50. While this scraping step is done, the sleeve is slowly rotated so that the grooves are somewhat semicircular in form as shown in FIG. 1B.

Looking at FIG. 3, it is seen that the next step is to machine the counterplate retaining feature 42 using the same tool 62. According to the flow chart, this step would wait until two further steps have been carried out. Either alternative is very useful and the sequence shown in FIG. 3 has been found to be slightly more efficient. The next step 92 would be to machine the hub 12 OD, with its flange. This would necessitate a X-axis or radial movement of the platform to align tool 72 with the outer surface of the hub. Another X-axis movement of the platform aligns a brush tool 74 with the main bore of the sleeve so that the brush step 94 can be accomplished. Finally, a further X-axis movement of the platform realigns the boring bar with the abutment 18 and the cavity where the thrust plate will be located, so that the thrust plate radius can be accurately finished at step 96.

In summary, by following this sequence of events, each sleeve is efficiently manufactured utilizing a minimum number of tools mounted on the platform; each tool is brought in alignment with the sleeve and then stepped or moved in the X-direction or axial direction so that the function of the process can be carried out.

Other features and advantages of the present invention will become apparent to a person of skill in the art who studies the present invention disclosure, who may also adopt alternatives to the preferred sequence disclosed herein. Therefore, the scope of the present invention is to be limited only by the following claims.

It can be seen that by providing a platform for mounting the tools which is movable in a direction parallel with a center axis of the sleeve (axial movement) to bring each tool in contact with the target portion of the sleeve, while also making it movable in a direction perpendicular to the primary axis (radial movement) of the sleeve to bring alternative tools in alignment with the sleeve being worked on, that a very efficient process for machining each sleeve and hub combination is carried out.

What is claimed is:

1. In a method of fabricating a sleeve and hub assembly for use in a spindle motor wherein the sleeve has a bore, a first radial recess for a thrust plate which is supported between abutments on said sleeve and a second adjacent recess for a counterplate which is supported adjacent said thrust plate by a shoulder on said sleeve, and wherein an abutment for supporting said counterplate and defining said recess for said thrust plate has generally radial grooves across an axially facing surface thereof facing in a radial direction, a method of forming said grooves comprising:
      mounting a cutting tool on a platform adjacent said sleeve and movable intermittently and under program control perpendicular to a radial axis of said sleeve for bringing said cutting tool into alignment with said sleeve and parallel to the radial axis of said sleeve for bringing said cutting tool into contact with surfaces to be finished of said sleeve,
      said cutting tool is mounted on a common linear platform with a grooving tool and a hub finishing tool so that the precisely finished surfaces interior and exterior of said sleeve may be finished with a limited set of tools mounted on said single common platform,
      and wherein said groove of said abutment is formed by scraping a nose of said cutting tool across said axial surface of said abutment.

2. A method as claimed in claim 1 wherein said step of forming said generally radial groove is carried out while slowly rotating said sleeve about said axis of said sleeve.

3. A method of fabricating a sleeve and hub assembly as claimed in claim 2 wherein said method includes the steps of boring a pre-grooving opening in said sleeve; machining a thrust plate cavity at an axial end of said sleeve; and machining a counterplate retaining feature in said sleeve; all of said steps being carried out by a common boring tool mounted on said platform.

4. A sleeve and hub assembly for incorporation in a hydrodynamic bearing defined between said sleeve and a shaft rotatable relative to said sleeve and having a thrust plate on an end surface thereof rotating in a recess in said sleeve which terminates in an abutment, and a counterplate resting on said abutment and fixed within shoulders defined on said sleeve, said abutment for supporting said counterplate further incorporating at least one radial groove extending entirely across an axial end surface of said abutment to allow filling of said hydrodynamic bearing with fluid.

5. A sleeve and hub assembly for a hydrodynamic bearing as claimed in claim 4 wherein said groove on said abutment is slightly curved relative to a radius line of said sleeve.

6. A sleeve and hub assembly for a hydrodynamic bearing as claimed in claim 5 wherein a base of said groove on said abutment is slightly curved in cross-section.

7. A sleeve and hub assembly for a hydrodynamic bearing as claimed in claim 6 wherein each of the grooves extends from an inner axial surface to an outer axial surface of the abutment.

\* \* \* \* \*